United States Patent Office 3,075,917
Patented Jan. 29, 1963

3,075,917
PROCESS FOR THE SELECTIVE HYDROGENATION OF HYDROCARBON MIXTURES
Walter Kronig, Leverkusen, Arno Meckelburg, Dormagen, Gerhard Scharfe, Leverkusen, Bernhard Schlepping-hoff, Dormagen, and Walter Schmidt, Koln-Stammheim, Germany, assignors to Farbenfabriken Bayer Aktien-gesellschaft, Leverkusen, Germany, a corporation of Germany
No Drawing. Filed Aug. 8, 1960, Ser. No. 51,008
Claims priority, application Germany Dec. 17, 1957
33 Claims. (Cl. 208—255)

This invention relates to the selective hydrogenation of hydrocarbon mixtures and especially to the selective hydrogenation of acetylenes and/or diolefines in hydrocarbon mixtures.

In the cracking (pyrolysis) of mineral oils, primarily crude petroleum oils, their fractions and residues, fractions containing substantially hydrocarbons with 2 and/or 3 carbon atoms are obtained in the gas separation plant connected to the cracking plant, in addition to gaseous hydrocarbons, for example $C_4$-hydrocarbons, among other hydrocarbon fractions. Such fractions, which comprise essentially ethylene and ethane and/or propylene and propane, depending on the reaction conditions, also contain relatively small quantities of acetylene or methyl acetylene and allene. For some uses of these so-called $C_2$-fractions or $C_3$-fractions, a content of acetylene, methyl acetylene, and frequently also the allene, is of disadvantage, so that it is necessary or at least expedient for these compounds to be removed as completely as possible prior to employing the said fractions for such uses. The process normally employed for the removal of these compounds consists in conducting the fractions in the gas phase and with the addition of small quantities of hydrogen over a selective hydrogenation catalyst at elevated temperatures, for example in the region of 90 to 175° C., whereby the acetylene is hydrogenated to ethylene and the methyl acetylene and allene ($C_3H_4$) are hydrogenated to propylene and propane respectively. The pyrolysis gases thus treated are then again cooled, since they are usually delivered at normal temperature to the further processing plants. In general, it is not possible in this way to avoid entirely the hydrogenation to ethane and propane, respectively, of certain quantities of the ethylene or propylene formed on pyrolysis. Generally with this process, for example, for each mol of the methyl acetylene and allene to be hydrogenated, 2 mols of propylene also are hydrogenated, to propane. The process moreover suffers from the disadvantage that the hydrocarbon-fractions, which are obtained in a liquid state after the separation of the pyrolysis and which are to be further utilised in the liquid state, have to be converted into the gaseous form for purification purpose and thereafter liquefied again. Prior to and after the treatment, therefore, considerable heating and cooling energy has to be supplied, the latent heat of evaporation demanding the major part of such energy requirements.

In addition, polymers are formed by homopolymerisation of the acetylenes or diolefines, or by their co-polymerisation with one another or with olefines, in the course of purification procedure described above. Since the resulting polymers frequently interfere with the further processing of the hydrocarbon products so treated, they must be separated therefrom, for example by fractional distillation.

In carrying out the purification procedure described above, it is not possible to avoid the polymerisation sometimes proceeding to such a degree that the polymers formed no longer remain detached from the catalyst, but are retained thereon. Even after only a few weeks, this leads to such damage to the catalyst that it has to be regenerated, this usually being effected by passing air thereover at a relatively high temperature.

With the thermal cracking (pyrolysis) of mineral oils or mineral oil fractions, a hydrocarbon fraction consisting substantially of hydrocarbons with 4-carbon atoms "$C_4$-fraction" is inter alia recovered in gas-separation plants connected to the cracking plant. This fraction is usually recovered as overhead product when hydrocarbons with 4 and more carbon atoms are subjected to pressure distillation. The fraction consisting essentially of hydrocarbons with 4 carbon atoms contains predominantly n-butenes, i-butene, 1,3-butadiene, butane and in addition small quantities of vinyl acetylene, ethyl acetylene and diacetylene, as well as small quantities of other hydrocarbons, including 1,2-butadiene.

If the 1,3-butadiene shall be isolated from the $C_4$-fractions, for example by selective extraction with copper salt solutions, it is necessary to remove at first from the $C_4$-fractions those compounds which cause trouble during the isolation of the 1,3-butadiene and contaminate the isolated butadiene. Such compounds which have to be removed are especially the acetylenes. For the removal of these disturbing compounds various methods are known. For example use is made of the greater solubility of the acetylenes in copper salt solutions. The devices required in this selective extraction of the acetylenes are extensive and costly.

Furthermore, a selective hydrogenation of the acetylenes in the gas phase has been used. The process consists in that the $C_4$-fraction is conducted in the gas phase and with addition of hydrogen, at temperatures from 175 to 345° C. and pressures from 0 to 7 atm. gauge, over a selective hydrogenation catalyst, the vinyl acetylene being almost completely hydrogenated to butadiene or to butenes (see United States patent specification No. 2,775,634).

Generally, the $C_4$-fraction to be purified is available as a liquid. For carrying out the hydrogenation procedure described above, the hydrocarbon mixture must consequently first be evaporated and heated to the required temperature. Since the hydrocarbons which are treated are usually required to be in the liquid condition again when they are further utilized, they must be cooled and condensed after this treatment. Consequently, considerable heating and cooling energy is required.

Furthermore, the butadienes and acetylenes contained in the $C_4$-fraction show a tendency to polymerize at the temperatures which are employed; polymerization of 1,3-butadiene generally occurs to an appreciable and disturbing degree at temperatures above 100° C. The polymers formed can easily lead to blockage in the preheating device and to damage of the catalyst, and thereby reduce its activity and effective life. In addition, these polymers often interfere with the further processing of the treated $C_4$-fraction and must be separated from the treated product, for example by fractional distillation.

If $C_4$-fractions are used directly for certain purposes, for example as fuels or combustible gas, or if these fractions are used directly for chemical reactions there have to be removed the acetylenes and the butadiene contained therein, since these compounds cause undesired side-reactions. Especially if these fractions are used for chemical reactions it is desired to remove the butadiene without changing the content of the butenes. It is, for example, difficult to isolate the isobutene from $C_4$-fractions if these fractions contain butadiene. In these cases it is important that the butadiene is removed without diminishing the content of the isobutene in remarkable amounts. If the butadiene content of the $C_4$-fractions is large enough to isolate the butadiene by the konwn methods in an economical manner, this will be the preferred method. In many cases the content of butadiene is so low that it cannot be isolated in an economical manner. In other cases the entire amount of $C_4$-fractions is not sufficiently large enough to remove the butadiene in an economical manner so that the butadiene must be removed by other methods.

It is furthermore known that liquid hydrocarbons of the gasoline boiling range can contain undesired, unsaturated hydrocarbons especially hydrocarbons which tend to gumming, such as diolefins, for example butadiene or acetylenes, such as methylacetylene, ethylacetylene or vinyl acetylene.

Such liquid hydrocarbons are, for example, obtainable when mineral oils, mainly crude petroleum oils, their fractions or residues, more especially fractions in the gasoline boiling range, are subjected to heat-racking (pyrolysis) at temperatures above 600° C., as a gasoline (so-called "cracked gasoline" or also "pyrolysis gasoline") besides gaseous cracking products. The gasoline contains considerable amounts of highly unsaturated and mainly diolefinic hydrocarbons, and also acetylenes. This gasoline is not suitable for direct use as a fuel, since even after a short operating time in the engine, it leads to gumming and sticking. Furthermore, there are obtained such liquid hydrocarbons of the gasoline boiling range by the oligomerization of gaseous olefins, especially of hydrocarbons containing 3 or 4 carbon atoms, which had a content of small amounts of diolefins, such as allene or butadiene and/or acetylenes such as methyl acetylene, ethyl acetylene or vinyl acetylene. Furthermore, there can be obtained liquid hydrocarbons of the gasoline boiling range containing said undesired unsaturated hydrocarbons if saturated hydrocarbons are dehydrogenated to monoolefins since thereby generally small amounts of diolefins and acetylenes are also formed.

Many processes are known for removing the undesired (gumming) olefinic and mainly diolefinic constituents by selective hydrogenation of said liquid hydrocarbons that the harmless and desirable olefinic and aromatic hydrocarbons are retained wholly, or at least for the major part. Some of these processes are carried out in the gas phase and some in the liquid phase. When working in the liquid phase, it is also usual to work in the trickle phase.

Considerable difficulties are involved when working in the gas phase, since it is not possible so to evaporate the highly unsaturated initial materials that no residues are formed in the vaporization devices or in the reaction chamber itself.

This danger is reduced when working in the liquid phase; however, when working in the liquid phase with prior known processes, the temperatures used are such that they lead to deposition of polymerization products in the heating device or reaction chamber, when operating for a relatively long time. Even at temperatures of 50° C. the initial materials start to become thermally unstable and above 100° C., the formation of polymerization products which lead to clogging of the system becomes greater. It is possible to obtain assistance in this connection by removing the polymerization products, formed during the heating, by mechanical means before entering the reaction chamber. It is, however, not possible to prevent the polymerization products of a lower degree of polymerization impairing the activity of the catalyst. Consequently, the reaction temperature must constantly be raised during the operating period in order to produce an adequate effect. After a certain time, such a temperature, is then reached that a selective hydrogenation is no longer possible. The catalyst must then be regenerated or replaced.

Similar difficulties arise if from the said liquid hydrocarbons there shall be removed the mono-olefins. This is necessary if cracked gasoline shall be used for example as aviation fuel or if there shall be extracted from the cracked gasoline the aromatic compounds contained therein. In these cases the mono-olefins are usually hydrogenated at elevated temperatures, for example at temperatures between 250 to 400° C. Thereby resinous compounds are formed during the heating up resp. on the hydrogenation catalysts which originate from the diolefins contained in the cracked gasoline. This leads to an inactivation of the hydrogenation catalyst.

It is an object of the instant invention to provide a method for removing undesired unsaturated hydrocarbons from hydrocarbon mixtures by a selective hydrogenation. Another object is to remove these unsaturated hydrocarbons from hydrocarbon mixtures boiling up to 200° C. especially from those hydrocarbons containing at least 2 carbon atoms, such as $C_2$-, $C_3$-, $C_4$- or $C_5$- fractions or liquid hydrocarbon mixtures of the gasoline boiling range. A further object is to provide a new method to remove acetylenes from such hydrocarbon mixtures which contain preferably diolefines especially conjugated diolefines. Still another object is to remove diolefines such as butadiene from such hydrocarbon mixtures which contain preferably besides the diolefines, monoolefines, especially butenes or pentenes. A still further object is to provide a new method for the selective hydrogenation of unsaturated hydrocarbons in the liquid phase and more preferably in the trickling phase. Furthermore it is an object of the instant invention to provide a new economical process for such selective hydrogenation especially a process with a very high throughput of hydrocarbons. Other objects will appear hereinafter.

These objects are attained in accordance with the present invention by removing acetylene, methyl acetylene and allene from hydrocarbon mixtures consisting essentially of hydrocarbons with 2 and/or 3 carbon atoms without the above described disadvantages if the hydrocarbon fractions to be treated are conducted in a liquid state in the so-called trickling phase, i.e. in a downward stream and in a hydrogen atmosphere over a hydrogenation catalyst disposed in the reaction chamber.

The hydrocarbons which are submitted to the new process and which contain acetylene, methyl acetylene and/or allene should essentially consist of hydrocarbons with 2 and/or 3 carbon atoms. Such products may be obtained, for example, by the pyrolysis of mineral oils after working up the cracking products thereby formed. In addition to the specified hydrocarbons, the hydrocarbon mixtures may also contain small quantities of higher and lower hydrocarbons.

The mixtures should be free from catalyst poisons, and more especially from sulphur compounds.

The process of the invention is preferably carried out at temperatures of from −40° to +50° C. When using a hydrocarbon mixture consisting essentially of $C_2$-fraction, it is expedient to work in the temperature range between −40° and +5° C., and most advantageously at from −30 to −10° C. whereas the temperature when using a $C_3$-fraction is preferably somewhat higher, namely between 0° and 50° C., and most advantageously from 10 to 30° C. The pressure in the system should be regulated by the supply of hydrogen at the inlet end of the reactor and should be so regulated that it is sufficiently higher than the saturation pressure of the hydrocarbons at the selected temperature. For example, when working at −20° C. with a $C_2$-fraction, a working pressure of approximately 30 atm. gauge is desirable, whereas working pressures between 12 and 30 atm. gauge are advisable when using a $C_3$-fraction at +20° C.

The introduction of the hydrogen into the hydrogenation system can be so regulated that the undesired constituents (acetylene, methyl acetylene, allene) are substantially completely hydrogenated to ethylene, propylene, and propane respectively, but that the ethylene and the propylene in the hydrocarbon mixture are hydrogenated in quite subordinate quantities at the most.

When the reaction temperature and the throughput of raw material through the system have been established, the pressure in the system can be used as a standard for the addition of hydrogen, since this pressure rises as more hydrogen is supplied. It is advantageous to use high-percentage hydrogen. In this case, the impurities of the hydrogen remaining after exhaustion of the hydrogen by the hydrogenation of the acetylene and methyl acetylene or allene or dissolved in the reaction product and thus removed from the hydrogenation system. In thise case it is not necessary to withdraw gases from the collecting vessel for the liquid reaction product, that is to say the selective hydrogenation takes place in a practically static gas atmosphere with the supply thereto and discharge therefrom of the liquid hydrocarbon fraction. If relatively impure hydrogen is used, the hydrogen impurities which do not dissolve in the reaction product must be released in gas form from the collecting vessel for the said reaction product. The hydrogen introduced must be free from catalyst poisons for the hydrogenation catalyst, and more especially from sulphur compounds and carbon monoxide.

It is of great importance that the throughput of crude material through the catalyst chamber should be high. With hydrocarbon fractions which contain acetylene, methyl acetylene and allene in proportions which are each below 2% by weight, and usually each below 1% by weight, it is advisable to use throughputs of 3–40 kg., and preferably 8–30 kg., of hydrocarbon fractions per liter of catalyst volume and per hour. When the raw material has particularly high contents of acetylene, methyl acetylene and allene, it is frequently advantageous for some of the reaction products to be returned into the hydrogenation system in order to lower the concentration of the said impurities at the inlet end of the system and thus to counteract a local rise in the temperature caused by the heat of hydrogenation. Expediently fixed bed catalysts are used in the reaction chamber. Examples of hydrogenation components in the catalyst are the precious metals of the VIIIth group of the Periodic System of the elements, and primarily palladium and platinum, which are applied in quantities of about 0.1 to 5% and advantageously of from 0.5 to 3%, to a support which may, for example, consist of active aluminum oxide gel, silica gel or active carbon; natural silicate such as an aluminum silicate or magnesium silicate, are of course also suitable for use as supports for the precious metals. Especially suitable are those macroporous supports which have an internal surface of less than approximately 50 m.$^2$/g. and a water absorption capacity of at least 10%. It is particularly advantageous to use those supports which have a water-absorption capacity of 20% or more and an internal surface of less than 20 m.$^2$/g.

The macroporous supports should have a good absorption capacity on impregnation with the catalyst solution, but a relatively low internal surface. The absorption capacity is expediently indicated in parts by volume of water which can be taken up by 1 part by volume of the dried solid body (support). The internal surface can be determined by the method of Brunauer, Emmet and Teller (see Journal of the American Chemical Society, vol. 60 (1938), page 309 (BET-method)).

An example of a support which is especially suitable is a lightly calcined clay which has a low content of or is free from iron, for example fragments of clay dishes. Pumice stone free from iron is also suitable, as well as lightly sintered aluminium oxide or magnesium oxide which has been obtained by thermal treatment of iron-free magnesite. The catalysts can be applied to such supports by conventional methods, for example by treating them with solutions of compounds of the catalysts and by then precipitating the metals used as catalysts in the said quantities by reduction on the supports.

These macroporous supports are characterized by a particularly constant hydrogenation activity and the activity thereof is not impaired in practice, even with temporary interruptions in the hydrogenation process.

In carrying out the process of the invention it is advantageous to use as a reaction vessel vertically disposed tubes with a large ratio between height and diameter, in order that the distribution of the liquid raw material through the cross-section should be as uniform as possible over the entire length of the reaction chamber. If it is necessary to use tubes with a large diameter, it is advisable to ensure uniform distribution by suitable intermediate baffles.

The heat of reaction developed can be dissipated through the wall by installing cooling devices using water, boiling liquid ammonia or brine, so that the reaction chamber can be maintained at a substantially constant temperature throughout its length. In a preferred embodiment of the invention the reaction room is divided into a larger amount of pipes with small diameter which can be kept at a desired temperature by an external cooling medium.

Essential advantages of the process as compared with what is known consist in that the raw material for the hydrogenation treatment is usually available in liquid form and does not have to be heated and evaporated, and furthermore that the hydrogenation product does not have to be cooled and condensed. As a consequence, considerable quantities of energy are saved and it is merely necessary to dissipate the heat of reaction.

The fact that the hydrogenation takes place in the liquid trickling phase permits a far higher throughput per unit of reaction volume and time than that which is achieved by the known gas phase process. One particular advantage of the process consists in that as a result of the low working temperature practically no polymers or co-polymers are formed, so that fractional distillation of the reaction product becomes superfluous. In addition, the polymers which may be formed in extremely small quantities are constantly washed off the catalyst by the stream of liquid, so that polymers do not cause any damage to the catalyst, whereby it becomes unnecessary to regenerate the latter.

It has been furthermore found that the objects mentioned above are attained by a selective hydrogenation of butadiene and/or acetylenes from hydrocarbon mixtures consisting essentially of hydrocarbons with 4 carbon atoms ("$C_4$-fraction"), whereby the hydrocarbon mixture is treated under pressure with hydrogen in a liquid condition in the trickle-phase over a hydrogenation catalyst fixedly arranged in the reaction chamber, whereby in the reaction chamber such conditions are maintained by variation of the hydrogen partial pressure, temperature and the hydrocarbon through-put that substantially only the acetylenes or the butadiene and the acetylenes if such are present are hydrogenated without forming substantial amounts of butane.

In most cases the hydrocarbon mixture to be treated according to the invention will consist mainly of $C_4$-hydrocarbons. On the other side it is not necessary to use an isolated $C_4$-fraction, but the hydrocarbon mixture to be treated can contain besides the $C_4$-hydrocarbons portions of higher and lower hydrocarbons. For examples there can be subjected to the process of the invention mixtures of $C_3$- and $C_4$-fractions. These fractions are obtained as mentioned above for example by the pyrolysis of mineral oils or mineral oil fractions and especially at the thermic cracking and at thermic reforming processes. From the mixtures thus obtained the hydrocarbons to be treated according to the present invention can be obtained e.g. by fractionation. The hydrocarbon fraction to be used shall be free from catalyst poisons, especially of sulfur compounds. These compounds can be removed, for example by washing the hydrocarbon fractions with aqueous sodium hydroxide solution.

The process is preferably carried out at temperatures from 0 to 50° C., advantageously 10 to 35° C.

Thereby the hydrogenation conditions are obviously the milder the lower the reaction temperatures used are.

The pressures used are advantageously such that they are sufficiently above the saturation pressure of the hydrocarbon mixture used at the selected temperature. If a temperature of for example 25° C., is used, it is advisable to have working pressures between 5 and 20 atm. gauge. Thereby again the hydrogenation conditions are the milder the lower the hydrogen pressure in the reaction chamber is. If, for example, only the acetylenes but not the butadiene contained in the hydrocarbon mixture shall be hydrogenated, a lower hydrogen pressure will be selected for the hydrogenation of the acetylenes than for the hydrogenation of the butadiene. In most cases good results are obtained if for the selective hydrogenation of the acetylenes hydrogen pressures of between 3 to 10 atmospheres gauge are used, while for the hydrogenation of the butadiene hydrogen pressures within 5 to 20 atmospheres gauge are preferably used. The most suitable hydrogen pressures depend on the general reaction conditions such as temperature, throughput of the hydrocarbon mixture, composition of the hydrocarbon mixture, activity of the hydrogenation catalysts etc., and can be determined easily by test experiments, for example by testing the composition of the hydrogenation products obtained.

It is advantageous to use as hydrogen source such gases which have a high-percentage of hydrogen. In this case, the hydrogen impurities remaining after the hydrogen has been used up by the hydrogenation of the acetylenes are dissolved in the reaction product and thus removed from the hydrogenation system. In this case, it is not or only to a minor extent necessary to expand gas from the collecting vessel which takes up the hydrogenation product. If hydrogen with relatively large quantities of impurities such as nitrogen or methane is used, those hydrogen impurities not dissolved in the hydrogenation product must be expanded in gaseous form from the collecting vessel of the reaction product. The hydrogen used must be free from substances which act as catalyst poisons for the hydrogenation catalyst, more especially sulphur compounds and carbon monoxide. The selective hydrogenation according to the process of the instant invention takes place in a practically motionless hydrogen atmosphere.

It is of great importance for the process of the invention that it enables a very high throughput of the hydrocarbon mixture to be treated through the reaction chamber. Thereby it is again obvious that a high throughput of the hydrocarbon mixture through a given reaction chamber results in a milder hydrogenation compared with those processes in which not so high a throughput is used. Thus, the same holds true for the removal of the acetylenes and the butadiene as is mentioned before for the use of the hydrogen pressure. With a $C_4$-fraction containing vinyl acetylene and ethyl acetylene in quantities of below 2% by weight it is recommended that hourly throughputs of the $C_4$-fractions through the reaction chamber should be 5 to 40 kg., preferably 10 to 35 kg. of the $C_4$-fraction per liter of catalyst to remove the acetylenes by selective hydrogenation. To remove butadiene from a hydrocarbon fraction containing about 5% by volume of butadiene preferably throughputs of the hydrocarbon fraction of 3 to 20 kg., preferably 5 to 15 kg. per liter of reaction chamber are used. If the hydrocarbon mixture has a high content of acetylenes or butadiene, for example 20 to 40% by volume of butadiene, it is frequently advantageous to recycle some of the hydrogenation product into the hydrogenation system in order to lower the said concentration at the inlet of the system and thus to counteract a local rise in temperature caused by the heat of hydrogenation.

The catalysts are preferably fixedly arranged in the reaction chamber. Suitable as hydrogenation components in the catalyst, are, for example, noble metals of the 8th group of the Periodic System, primarily palladium and platinum, which are applied in quantities of 0.2 to 5%, advantageously 0.5–3% by weight, on a support. Nickel and cobalt can be also used as catalysts, for example in amounts of 2 to 15%, preferably 5 to 10% by weight on the carrier (support).

The hydrogenation component of the catalysts can be brought on the carriers by the known methods. In general it is preferred to use solutions of the salts of these compounds. If noble metal compounds are used, the metals are reduced on the carriers from the solution to obtain the free metals. If metal salts are used from which the metals can only difficultly be reduced in solution, such as the nickel or cobalt salts which are preferably used as organic salts such as formiates or acetates or as ammine complex salts, it might be of advantage to obtain the metals on the carriers by a thermic decomposition of said salts with subsequent reduction with hydrogen at temperatures between 300 to 400° C. The catalysts can be used in general for various months before they lose their activity. They can obtain their selectivity again by a regeneration. This regeneration can be carried out if noble metal catalysts are used by passing over the catalyst oxygen-containing gases at temperatures between 300 to 500° C. Upon cooling off the catalyst can directly be used again. The catalysts which contain for example nickel or cobalt can be reactivated under the same conditions but they have to be subjected to an after-treatment with hydrogen.

Suitable supports for the process according to the invention are for example slightly fired clays which are free from or have a low content of iron, for example fragments of clay pots. Also suitable are pumice stone free from iron or weakly sintered aluminum oxide or magnesium oxide, obtained by heat-treatment of iron-free magnesite or furthermore active aluminum oxide gel, silica gel active carbon or natural silicates, such as aluminum silicates, magnesium silicates and the like. The catalysts of the process according to the invention can be applied to these supports by treating them with, for example, solutions of compounds of the catalysts.

Particularly suitable are macro-porous supports with an internal surface of less than 50 m.$^2$/g. and a water absorption capacity of at least 10%. It is advantageous to use those supports which have a water-absorption capacity of 20% and higher and an internal surface of less than 20 m.$^2$/g.

The macro-porous supports have a good absorption capacity on being impregnated with catalyst solution, but have a relatively low internal surface. The absorption capacity is preferably indicated in parts by volume of water, which are able to absorb 1 part by volume of the dried solid substance (support, carrier). The internal surface can be determined by the method of Brunauer, Emmett and Teller (cf. Journal of the American Chemical Society, vol. 60 (1838), page 309 (BET method)).

When using the supports described in accordance with the invention, catalysts are obtained which are distinguished by a particularly constant hydrogenation activity and which are in practice not impaired, as regards their activity, by temporary interruptions of the hydrogenation.

Vertical tubes with a large ratio between height and diameter are advantageously employed as reaction vessels in order that the liquid raw material is distributed as uniformly as possible over the cross-section and throughout the total length of the reaction chamber.

Especially suitable are for example tubes of 50 mm. internal diameter and of about 3000 mm. length, several of which can be connected to a group within another tube of a corresponding larger inner diameter, whereby through said larger tube a cooling liquid is passed through. If it is necessary or desired to use tubes, with a larger inner diameter, it is desirable to ensure a uniform distribution by suitable intermediate fittings. The heat of reaction set up can be discharged through the wall or by installation of cooling arrangements operating with water, brine of evaporising liquids such as ammonia, $C_3$-fractions or $C_4$-fractions.

An essential advantage of the process consist in that the hydrocarbon mixture to be treated which is usually available in liquid form, can be used for the hydrogenation directly as liquid.

One particular advantage of the process further consists in that no polymers or copolymers are formed, owing to the low working temperature. Moreover, the extremely small quantities of polymers which may be formed are constantly washed off the catalyst by the liquid stream, so that no damage to the catalyst can be caused by polymers and thus no redistillation of the hydrogenation product is necessary to remove polymerizates.

Due to the very high throughputs which are possible by the process of the invention the reaction chambers have very small dimensions which are substantially smaller than those necessary for a hydrogenation in the gas phase.

It was especially surprising that the selective hydrogenation described could be carried out in such a manner that only small amounts of acetylenes present in the hydrocarbon mixtures to be treated could be hydrogenated without hydrogenating substantial amounts of the butadiene and butenes which are present in a very high surplus or that it was possible under somewhat stronger hydrogenation conditions to hydrogenate the butadiene practically exclusively to butenes without hydrogenating butenes which are present in a very high surplus to butanes.

Furthermore it has been found that the disadvantages referred to above can be avoided and the objects mentioned can be attained if the liquid hydrocarbons of the gasoline boiling range which contain undesired unsaturated hydrocarbons, especially those which easily tend to gumming, are treated at temperatures below 50° C. in the trickle phase in the presence of hydrogenation catalysts which are disposed on macroporous supports, which supports have an intrinsic surface of less than approximately 50 m.$^2$/g. and a water-absorption capacity of at least 10%.

The liquid hydrocarbons of the gasoline boiling range are especially those hydrocarbons and hydrocarbon mixtures boiling within the range between about 30 and 200° C. which contain unsaturated undesired hydrocarbons, examples of which are mentioned above. Such liquid hydrocarbons resp. hydrocarbon mixtures can be obtained for example by the methods described above. The cracked gasoline can be obtained for example by known methods by cracking liquid or liquefiable hydrocarbons at temperatures above 600° C., for example up to 900° C. or even at higher temperatures, for example up to 1400° C.

The process according to the invention is carried out by introducing the liquid hydrocarbons to be treated into the upper part of the reaction tube and allowing it to trickle down in the reaction chamber over the catalyst and if desired over fittings or obstacles which cause splitting up of the liquid hydrocarbons. A hydrogenation gas is simultaneously introduced into the reaction chamber at a rate equal to the rate of consumption. The temperature in the reaction chamber is below 50° C. and preferably below approximately 40° C., but generally above 0° C. It is for example possible to operate in such a way that the liquid hydrocarbons are introduced into the reaction tube at a temperature of approximately 20° C. Due to the heat of reaction being set up, the reaction temperature in the reaction tube can rise gradually towards the bottom end of the reaction chamber, for example up to 40° C.

The liquid hydrocarbons can also be initially supplied at a somewhat higher or lower temperature to the reaction chamber, and care must be taken to see that the temperature in the reaction chamber is during the main hydrogenation period always below 50° C. It is of course also possible so to operate that the temperature is permitted to rise a few degrees and then be lowered again by an indirect or direct intermediate cooling, whereupon the temperature is again allowed to rise and then is again cooled, and so on. With initial materials which are particularly highly unsaturated, it is advisable to recycle some of the hydrogenation product into the reactor in order to lower the concentration of diolefins in the starting material. This procedure avoids the difficulties which occur otherwise if the liquid hydrocarbons are heated, and by following the procedure of the invention, no decrease of the catalyst activity due to the deposition of polymers on the catalyst is observed.

As the hydrogenation gas, it is possible to use pure hydrogen or a hydrogen fraction from the separation of hydrogen-containing gases, for example hydrogen mixed with methane, it being advisable for the hydrogen content of the mixture to amount to more than 60% by volume, although mixtures with a lower hydrogen content, for example 50% by volume, can also be used. It is necessary for carbon monoxide to be removed from the hydrogenation gas as far as possible and this is advantageously effected by the known methanization. The hydrogen must be free from hydrogen sulfide and readily decomposable organic sulfur compounds, such for example as mercaptans. The initial material to be introduced must also be free from hydrogen sulfide and from readily decomposable organic sulfur compounds, whereas sulfur compounds which are difficult to decompose, such as for example thiophenes, are obviously not of great disadvantage when present in small quantities. It is advisable to use hydrogen pressures between about 10 and 50 atm. preferably 20 to 30 atm. In the presence of other gases in the hydrogenation gas, the total pressure of the gas must be kept correspondingly higher.

Since the process according to the invention is conducted in the trickle phase, the initial material to be treated flows through a hydrogen atmosphere. If a high-percentage hydrogen is used, it is not necessary to release the gas at the end of the reaction chamber, since the insignificant impurities in the hydrogenation gas are removed from the system by dissolving some of the gas in the treated cracked gasoline. If a hydrogenation gas with a lower hydrogen content is used, a certain quantity of gas must always be released from the collecting vessel in order to ensure an adequate supply of hydrogen to the reaction system. The hydrogen pressure is regulated in both cases to within the aforesaid range according to the desired hydrogenation effect in such a way that the undesired constituents are hydrogenated and the desired constituents are not hydrogenated.

Mainly to be considered as hydrogenation catalysts are the noble metals, especially those of the 8th group of the periodic system of the elements such as platinum and palladium, which are preferably deposited in amount of about 0.05 to 5% by weight, advantageously 0.1 to 1% by weight, on supports. As already mentioned, the supports should be absorptive, but only have a small intrinsic surface. Supports suitable for the process according to the invention are for example slightly fired clays with only a low content of or free from iron, for example fragments of clay dishes. Pumice stone free from iron is also suitable, as is lightly sintered aluminum oxide or magnesium oxide which has been obtained by thermal treatment of iron-free magnesite. Tar-free wood charcoal is also a suitable catalyst, and if desired the wood charcoal can be so gently treated with steam that its pores have become enlarged but the intrinsic surface remains below 50 m.$^2$/g. Generally speaking, the intrinsic surface should be greater than 3 m.$^2$/g.

When using the suitable supports, catalysts are obtained which are distinguished by a particularly constant hydrogenation activity, this activity not being impaired in practice, even with temporary interruptions in the hydrogenation. In contrast thereto, catalysts in which the noble metals are deposited on supports with a large intrinsic surface, which is for example in the order of magnitude of 100 to 500 m.$^2$/g. and higher, lose their initially very good activity after a few days. The throughput of the liquid hydrocarbons through the reaction chamber is preferably chosen to be between about 1 and 20 kg./liter of catalyst volume and per hour, preferably between 5 and 15 kg.

The hydrogenation conditions are so adjusted that the substances harmful to the use of the product in engines are sufficiently removed, but harmless olefines are substantially retained. The evaporation residue after the aging gives a standard for the proportion of harmful substances in the hydrogenation product redistilled to a final point of about 200° C. The aging of the product can be effected in accordance with the ASTM bomb test for automobile fuels (ASTM D525-49) and the determination of the evaporation residue (gum) according to DIN 51776 (German Industrial Norm). After the aging, the gum density should be less than 20 mg./100 cc., preferably below 10 mg.

The content of paraffins and naphthenes in the hydrogenation product is a standard for the undesired hydrogenation of the mono-olefins. This content can be determined by the so-called FIA method (DIN (German Industrial Norm) 51791). The content of paraffins and naphthenes should amount at the most to 5% (calculated on the redistilled hydrogenation product), and preferably should be not more than 3% higher than in the starting material.

Another standard for the upper limit of the hydrogenation of the desired hydrogenation product is the "knock" method of the redistilled product. The "knock" value (according to the CFR research method) of the product to which 0.06% by volume of lead tetraethyl has been added should not be lower with the hydrogenation product than with the initial material for the hydrogenation.

This application is a continuation-in-part application of our copending applications Serial Nos. 780,212, filed December 15, 1958, now abandoned, 8, filed January 4, 1960, and 21,619, filed April 12, 1960.

The following examples further illustrate the invention without, in any way, limiting it thereto.

*Example 1*

(a) A C$_3$-fraction with the following composition was used as raw material:

| Constituent | C$_2$-hydro-carbons | Propy-lene | Pro-pane | Methyl acety-lene | Allene | C$_4$-hydro-carbons |
|---|---|---|---|---|---|---|
| Percent by weight | 7.7 | 88.3 | 2.8 | 0.7 | 0.4 | 0.1 |

The catalyst was prepared by impregnation of aluminum oxide gel in the form of small rolls of a diameter of about 4 mm. and a length of about 7 mm. with palladium chloride, followed by reduction of the palladium salt to metal with hydrazine hydrate, so that the catalyst contained 2% of palladium metal. This catalyst was introduced in a quantity of 3.7 liters into a vertically disposed tube with an internal diameter of 40 mm. and a length of 4.5 m., the said tube being equipped with a water-cooling jacket.

60 kg. per hour of the said raw material were introduced in liquid form at a temperature of 15° C. into the upper part of the tube. At the same time, electrolytic hydrogen was introduced into the upper part of the tube under a pressure of 15 atm. gauge in such a quantity that the said pressure in the reaction chamber was constantly maintained; such quantity was about 500 l./hour. The raw material flowed through the reaction space which contained a hydrogen atmosphere. The lower end of the reaction chamber was enlarged to a collecting vessel, from the bottom end of which the reaction product was released in liquid form and in such a quantity that the collecting vessel was substantially half filled with liquid product. Release of the gas did not take place. On leaving the reaction chamber, the product had a temperature of 21° C. The reaction product contained less than 0.002% by weight of methyl acetylene and also of allene, and the propane content had risen to 3.4% by weight.

(b) Instead of the above catalyst there can be used the following catalyst:

Iron-free clay fragments which had a size of about 2-5 mm. were employed as a support for the hydrogenation catalyst. This material had an absorption capacity of 36 cc. of water per 100 cc. Thereof and an internal surface (BET method) of 5 m.$^2$/g. This support was impregnated with palladium chloride and the palladium was thereafter precipitated on the support by reduction with hydrazine hydrate. The catalyst thus obtained contained 0.8% of palladium metal.

(c) Similar results were obtained by using the following catalyst:

Finely powdered kaolin with a low iron content was granulated into balls of a diameter of 4-5 mm. by spraying with water. After drying and subsequent calcination at 1100° C., whereby the kaolin changed largely into mullite and amorphous silica, the balls had an absorption capacity of 30 cc. of water per 100 g. of dried material and an internal surface of 7 m.$^2$/g. Platinum in a quantity of 0.6% was precipitated on this support.

*Example 2*

The C$_3$-hydrocarbon fraction was introduced and the experiment carried out in the same way as described in Example 1, but instead of electrolytic hydrogen, a hydrogen-containing fraction from the fractionation of a pyrolysis gas was used. This fraction had the following composition.

| Constituent: | Vol. percent |
|---|---|
| Hydrogen | 49.0 |
| Methane | 44.4 |
| Nitrogen | 6.1 |
| Carbon monoxide | 0.5 |
| | 100.0 |

The gas mixture was introduced as the pressure under which it was formed in the fractionation plant, namely 28 atm. gauge, and was conducted at 350° C. over a catalyst which consisted of 90 parts by weight of nickel oxide and 10 parts by weight of thorium oxide and which had been reduced in advance with hydrogen at temperatures up to about 400° C. The catalyst was in the form of pellets. The carbon monoxide in the gas introduced was almost completely reduced to methane. This gas was employed as hydrogenation gas for purification of propylene without prior removal of the water formed in the carbon monoxide hydrogenation. The pressure in the propylene purifying plant was adjusted to 18 atm. gauge by regulating the quantity of purified hydrogen-containing gas supplied.

Differing from the method of procedure described in Example 1, gas was released from the gas phase in the collecting vessel for the reaction product in such a quantity that the hydrogen content of the released gas was 4 to 6% by volume.

To reduce losses, the released gas was returned to the gas fractionation plant. This released gas had the following composition.

| Gas constituent: | Vol. percent |
|---|---|
| Hydrogen | 5.0 |
| Methane | 16.0 |
| C$_2$-hydrocarbons | 10.0 |
| C$_3$-hydrocarbons | 64.0 |
| Nitrogen | 5.0 |
| | 100.0 |

The reaction product withdrawn in liquid form contained less than 0.002% by weight of both methyl acetylene and allene. The propane content was 3.6% by weight and the methane content 2%. By stringing the reaction product at 14 atm. and 14° C. with the initially described hydrogenation gas freed from carbon monoxide, the methane content was reduced to 0.4%.

If the hydrogen-containing fraction of the hydrogenation gas had been used without first removing the carbon monoxide, the hydrogenation of the methyl acetylene and allene practically ceased after an operating time of only a few hours.

*Example 3*

A $C_2$-fraction of the following composition (in percent by weight) was used as raw material:

| Constituent | Ethylene | Ethane | Acetylene | Methane |
|---|---|---|---|---|
| Percent by weight | 99.7 | 0.03 | 0.26 | 0.01 |

The catalyst was prepared by impregnating aluminum oxide gel in the form of small rolls of a diameter of about 4 mm. and a length of about 7 mm. with palladium chloride, followed by reduction of the palladium salt to the metal with hydrazine hydrate, so that the catalyst contained 1% of palladium metal. This catalyst was placed in a quantity of 1 liter into a vertical tube of a diameter of 20 mm. and a length of 3.2 meters, the tube being provided with a cooling jacket.

8 kg. of the said $C_2$-fraction were introduced hourly in liquid form at a temperature of −15° C. into the upper part of the tube. Likewise, electrolytic hydrogen under a pressure of 36 atm. gauge was also introduced into the upper part of the tube in such a quantity that the said pressure in the reaction chamber was constantly maintained, this quantity being about 55 liters per hour. The $C_2$-fraction flowed through the reaction chamber, which was in a hydrogen atmosphere. The lower end of the reaction chamber was enlarged into a collecting vessel, from which the reaction product was withdrawn at the bottom end in liquid form and in such quantities that the collecting vessel was filled to substantially half its height with liquid product. The ethylene withdrawn was conducted through the cooling jacket surrounding the reaction chamber, the pressure being lowered to such an extent that the latent heat of evaporation corresponded to the heat of reaction developed in the reaction chamber, that is to say practically the same temperature obtained throughout the entire reaction chamber. A release of gas did not take place. The $C_2$-fraction obtained contained less than 0.002% by weight of acetylene, and the ethane content had increased to 0.6%.

*Example 4*

As raw material, there was employed a $C_4$-fraction which had the following composition (percent by weight):

| Allene | Methyl acetylene | 1,2-butadiene | 1,3-butadiene | Vinyl acetylene | Ethyl acetylene | Butene | Butane |
|---|---|---|---|---|---|---|---|
| 0.002 | 0.002 | 0.12 | 35.30 | 0.16 | | 46.30 | 18.12 |

The catalyst was prepared by impregnating calcined kaolin in the form of small Raschig rings 4 mm. long and 4 mm. in external diameter with palladium-II-chloride solution and thereafter reducing the palladium salt to the metal with hydrazine hydrate, so that the catalyst contained 1.5% by weight of palladium. The support had an absorption capacity of 22 cc. of water per 100 cc. of dried material. In addition, the dried material had an internal surface of 7 m.²/g. (determined by the BET method). This catalyst was introduced in a quantity of 2.7 litres into a vertically disposed tube with an internal diameter of 40 mm. and a height of 2 m. The reaction tube was provided with a water cooling jacket.

56 kg. of the said raw material were hourly introduced in liquid form at a temperature of 6° C. into the upper part of the tube. A hydrogen fraction obtained from a gas-fractionating plant and having a hydrogen content of 65% by volume was also introduced into the upper part of the tube under a pressure of 11 atm. gauge and in such a quantity that the said pressure in the reaction chamber was constantly maintained. The raw material flowed through the reaction chamber which was under the hydrogen atmosphere. The lower end of the reaction chamber was enlarged to form a collecting vessel, from which the reaction product was removed in liquid form and in such a quantity that the collecting vessel was always filled to approximately half with liquid product. 350 litres of gas per hour were expanded above the liquid phase. The expanded gas had a hydrogen content of 21% by volume. On leaving the reaction chamber, the product had a temperature of 26° C. The reaction product contained less than 0.005% by weight of vinyl acetylene+ethyl acetylene. The 1,3-butadiene content had been reduced by 1% by weight.

*Example 5*

As raw material, there was used a $C_4$-fraction containing the following compounds:

| | Vol. percent |
|---|---|
| 1,3-butadiene | 39.3 |
| Vinyl acetylene+ethyl acetylene | 0.11 |
| Allene | 0.04 |
| Methyl acetylene | 0.16 |
| Butene | 44.0 |
| Butane | 16.18 |
| Non-$C_4$-hydrocarbons | 0.21 |

The catalyst was prepared by applying nickel formate to natural magnesium/aluminium silicate. The support had an internal surface of 100 m.²/g. and the absorption capacity was 30 cc. of water per 200 cc. of dried material. The prepared catalyst contained 8% by weight of nickel. The catalyst was introduced in a quantity of 3 litres into a vertically disposed tube with an internal diameter of 40 mm. and a height of 3 mm. The catalyst was initially heated in an inert gas stream to 300° C. and thereafter reduced at the same temperature with hydrogen.

After cooling to room temperature, 30 kg. of the said raw material were hourly introduced at a temperature of 12° C. into the upper part of the tube. Such a quantity of cooling water was supplied through the cooling jacket surrounding the reaction tube that the temperature at the outlet at the bottom end was 16° C. A hydrogen fraction with a hydrogen content of 75% by volume and forming in the gas-fractionation installation was likewise introduced into the upper part of the tube under a pressure of 15 atm. gauge and in such a quantity that the said pressure was constantly maintained in the reaction tube. The hydrogen fraction had been almost completely freed beforehand by a methanisation from the small quantities of carbon monoxide contained therein. The raw material flowed through the reaction chamber, which was under the hydrogen atmosphere. From the collecting vessel arranged below the reaction chamber and containing a liquid head, the liquid product was discharged for further use in the manner described in Example 4. 300 litres of gas were expanded per hour above the liquid phase. The expanded gas had a hydrogen content of 63% by volume. The liquid reaction product contained:

| | Vol. percent |
|---|---|
| 1,3-butadiene | 38.0 |
| Vinyl acetylene+ethyl acetylene | <0.003 |
| Allene | 0.04 |
| Methyl acetylene | 0.029 |
| Butene | 45.4 |
| Butane | 16.2 |
| Non-C₄-hydrocarbons | 0.33 |

*Example 6*

As raw material, there was used a butadiene-containing C₄-fraction. The catalyst was prepared by impregnating/sintering aluminum oxide in the form of small rolls having a length of about 4 mm. and an external diameter of about 4 mm. with palladium-2-chloride solution. Subsequently the palladium salt was reduced to the metal with hydrazine hydrate. The catalyst contained 1.8 parts by weight of palladium and had a water absorption power of about 35 cc. of water per 100 cc. of the dried material. The dried catalyst had furthermore an internal surface of about 10 m.²/g (determined according to the BET-method). This catalyst was brought in an amount of 3 litres into a vertically standing tube which had an internal diameter of 40 mm. The reaction tube was cooled with water.

Into the upper part of the tube there were hourly introduced 25 kg. of the above-mentioned C₄-fraction. A hydrogen fraction obtained from a gas-fractionation plant, having a hydrogen content of 70% by volume, was introduced into the upper part of the tube under a pressure of 15 atmospheres gauge and in such quantity that the pressure mentioned in the reaction chamber was constantly maintained. The hydrocarbon fraction flowed through the reaction chamber which was under the hydrogen atmposhere. The lower end of the reaction chamber was enlarged to form a collecting vessel from which the hydrogenation product was removed in liquid form and in such a quantity that the collecting vessel was always filled approximately half with liquid product. 300 litres of gas per hour were expanded from the room above the liquid phase of the collecting vessel. The expanded gas had a hydrogen content of about 25% by volume. Upon leaving the reaction chamber, the hydrocarbon mixture had a temperature of 20° C. The hydrocarbon mixture used as raw material and the hydrogenation product had the following composition:

| | Parts by volume in percent of— | |
|---|---|---|
| | Raw material | Hydrogenation product |
| Butane | 40 | 41.5 |
| i-Butene | 25 | 24.5 |
| n-Butene | 30 | 34.0 |
| Butadiene | 5 | 0.05 |

*Example 7*

Iron-free clay shards which had a size of about 2–5 mm. were used as support for the hydrogenation catalyst. This material had an absorption capacity of 30 cc. of water per 100 cc. of dried material (displaced volume). Furthermore, the dried material had an intrinsic surface (BET method) of 8 m.²/g. This support was impregnated with palladium chloride. Thereafter, the palladium was deposited on the support by reduction with hydrazine hydrate. The catalyst thus obtained contained 5% of palladium metal. 7 liters of the catalyst was introduced into a vertically disposed tube with an internal diameter of 40 mm. and a length of 6 meters, said tube being provided with a cooling jacket.

As initial material for the selective hydrogenation, there was employed a cracked gasoline from the pyrolysis of a predominantly aliphatic gasoline. 15 kg. of the said initial material were hourly introduced into the upper part of the tube in liquid form and at a temperature of 20° C. A hydrogenation gas which had a hydrogen content of 70% by volume, the remainder consisting mainly of methane and smaller quantities of nitrogen, was also introduced into the upper part of the tube under a pressure of 30 atm. This hydrogenating gas had been freed beforehand from carbon monoxide by methanization. The cracked gasoline trickled through the reaction chamber in which a hydrogen atmosphere was maintained. The lower end of the reaction chamber was enlarged to form a collecting vessel from which the reaction product was extracted at the bottom in such a quantity that the collecting vessel was approximately half filled with liquid product. From the volume of gas above the liquid product, 30 liters of gas per kg. of introduced initial material were released. The product has a temperature of 40° C. on leaving the reaction chamber.

A comparison of the properties of the initial material (cracked gasoline) introduced and of the hydrogenation product which is obtained is indicated in the following table, the data of the initial material and product having been determined after the redistillation and after adding the usual inhibitors against oxidation influences thereof:

| | Cracked gasoline introduced | Hydrogenation product |
|---|---|---|
| Specific gravity | 0.812 | 0.802. |
| Bromine number (g. bromine/100 g.) | 55.4 | 32.9. |
| Gum before ageing (mg./100 cc.) | 6.4 | 4.0. |
| Gum after ageing (mg./100 cc.) | 6,766 | 5.2. |
| Induction time (in minutes) | 45 | >240. |
| Color | Deep yellow | Colorless. |
| Odor | Unpleasant | Aromatically pleasing. |
| Research octane number without lead additive | 96.2 | 96.2. |
| Research octane number after addition of 0.06% lead tetraethyl | 96.7 | 98.2. |

After addition of conventional inhibitors, the redistilled hydrogenation product which is obtained is suitable as a carburettor fuel, while the redistilled initial substance, even after adding inhibitors, cannot in any case by used as a carburettor fuel.

*Example 8*

Iron-free sintered aluminum oxide was used as support for the hydrogenaton catalyst, and in the form of small rolls with a diameter of about 4 mm. and of the same length. The material had an absorption capacity of 32 cc. of water per 100 cc. of dry material and an intrinsic surface of about 4 m.²/g. This support was impregnated with palladium chloride. The palladium was thereafter deposited on the support by reduction with hydrazine hydrate. The catalyst thus obtained contained 4% by weight of palladium metal. 7 liters of the catalyst was introduced into a vertically disposed tube with an internal diameter of 40 mm. and a length of 6 meters, the said tube being provided with a cooling jacket.

Serving as initial material for the selective hydrogenation was a cracked gasoline from the pyrolysis of a predominantly aliphatic gasoline. 15 kg. of the said cracked gasoline were hourly introduced at a temperature of 20° C. and in liquid form into the upper part of the tube, and at the same time electrolytic hydrogen at a pressure of 30 atm. was introduced into the upper part of the tube. The cracked gasoline trickled through the reaction chamber, in which a hydrogen atmosphere was maintained. The lower end of the reaction chamber was enlarged into a collecting vessel, from which the reaction product was extracted at the bottom in liquid form and in such a quantity that the said collecting vessel was approximately half filled with liquid product. No gas was expanded from the gas chamber. On leaving the reaction chamber, the product had a temperature of about 35° C.

A comparison of the properties of the introduced initial material (cracked gasoline) and of those of the hydrogenation product which was obtained are given in the following table, the data of initial material and product having been established after the redistillation thereof and the usual introduction of inhibitors.

| Investigated material | Cracked gasoline introduced | Hydrogenation product |
|---|---|---|
| Color | Yellow | Crystal clear. |
| Odor | Unpleasant | Aromatically pleasant. |
| Specific gravity $d_{20}$ | 0.8308 | 0.8209. |
| Bromine number (g. Br/100 g.) | 57 | 30. |
| Gum before ageing (mg./100 cc.) | 2 | 2. |
| Gum after ageing (mg./100 cc.) | 4.725 | 2. |
| Induction time (min.) | 160 | 240. |
| Research octane number without lead | >100 | >100. |

*Example 9*

The hydrogenation was carried out in the same apparatus and with the same catalyst as described in Example 8.

Serving as initial material was a cracked gasoline from the pyrolysis of a predominantly aliphatic gasoline. The cracked gasoline, which contained 15% by weight of $C_5$-hydrocarbons with a content of 0.1% by weight of acetylenes, was so redistilled prior to the hydrogenation that its gum factor did not exceed 5 mg./100 cc. The redistillate was successively washed with 10% caustic soda solution and with water at room temperature. The washed product was cooled to 15° C. and conducted through an impact separator, which removed traces of water emulsified therein. The cracked gasoline thus pretreated was introduced at an hourly rate of 70 kg. (corresponding to an hourly throughput of 10 kg./liter of reaction chamber) at a temperature of 20° C. and in liquid form into the reactor. The other hydrogenation conditions were the same as in Example 8.

The cracked gasoline introduced into the hydrogenation reactor and the hydrogenated product are compared as follows, both products being investigated having merely been supplied with inhibitors in the usual way:

| Material being investigated | Cracked gasoline introduced | Hydrogenation product |
|---|---|---|
| Color | Yellow | Colorless. |
| Odor | Unpleasant | Aromatically pleasant. |
| Density $d_{20}$ | 0.808 | 0.798. |
| Bromine number (g. bromine/100 g.) | 47.7 | 26.1. |
| Gum before ageing (mg./100 cc.) | 5 | 2. |
| Gum after ageing (mg./100 cc.) | 284 | 5. |
| Induction time (min.) (according to ASTM D 525–49) | 19 | >240. |
| Research octane number without lead addition | >100 | >100. |
| Content of diolefinic compounds (percent by weight) | 15 | 1. |

It is to be particularly pointed out that the content of acetylenes in the $C_5$-fraction (hydrocarbons with 5 carbon atoms) had fallen to below 0.005% by weight and that practically no increase in the vaporization residue (gum) had been caused by the hydrogenation, so that the hydrogenation product can be used without redistillation as an engine fuel component.

If it is desired to use the raffinate, for example as an aircraft fuel component, it is necessary for the monoolefins remaining in the cracked gasoline to be practically completely hydrogenated, preferably without hydrogenating the aromatic substance. This can be effected in known manner, for example by hydrogenation in the gas phase over catalysts containing molybdenum, for example cobalt molybdate on aluminum oxide at about 350° C. under pressure of about 30 to 50 atm. of hydrogen and higher, the monoolefins being removed but the aromatic substances being retained.

If the initial material is subjected without the preceding hydrogenation according to the process of the invention to the gas phase hydrogenation under the said conditions, clogging occurs in the heating passage and in the catalyst chamber after a short operational period, this clogging being caused by formation of resinous products, originating from the diolefins of the initial material, and the catalyst action is already appreciably reduced after a short operating period.

*Example 10*

A polymer gasoline was obtained in known manner by passing propylene and a mixture of butylene isomers at about 250° C. over a usually used phosphoric acid catalyst. The gas mixture used contained small amounts of diolefins. The polymer gasoline obtained was redistilled. The redistillate in the gasoline boiling range had an insufficient oxidation stability, since the gum content upon the usual inhibition after ageing amounted to 45 mg./100 cm.³. The polymer gasoline was then treated according to the procedure of Example 8 in order to remove the gumming ingredients (diolefins). The product obtained thereupon showed after the usual inhibition and after the usual ageing a gum content of merely 4 mg./100 cm.³.

We claim:

1. In the process for removing acetylene, methyl acetylene and allene from hydrocarbon fractions consisting substantially of hydrocarbons selected from the group consisting of hydrocarbons containing 2 and 3 carbon atoms and mixtures thereof by treatment with hydrogen under pressure in the presence of a fixed bed hydrogenation catalyst in the reaction chamber the improvement which comprises conducting the hydrocarbon mixture in liquid trickling phase in a downward stream over a hydrogenation catalyst in a hydrogen atmosphere at a temperature of between −40° and +50° C. and recovering the hydrocarbon fraction substantially free of acetylene, methyl acetylene and allene.

2. A process as claimed in claim 1, which comprises conducting liquid hydrocarbons over the catalyst with throughputs of 3 to 40 kg. per liter of reaction chamber volume per hour.

3. A process as claimed in claim 1, which comprises using as hydrogenation catalyst a metal of the VIIIth group of the periodic system of the elements in an amount of 0.1 to 5% by weight on supports.

4. A process as claimed in claim 3, wherein the supports employed are macroporous supports which have an internal surface of less than approximately 50 m.²/g. and a water absorption capacity of at least 10%.

5. A process as claimed in claim 3 in which said hydrogenation catalyst is a member selected from the group consisting of palladium and platinum catalysts.

6. A process as claimed in claim 3 in which said catalyst support is a member selected from the group consisting of active aluminum oxide gel, silica gel, active carbon, aluminum silicate, magnesium silicate, and iron free clay fragments.

7. A process as claimed in claim 1 in which said catalyst is a nickel oxide and thorium oxide mixed catalyst.

8. In a process for the selective hydrogenation of at least one member selected from the group consisting of acetylene, methyl acetylene, and allene in a hydrocarbon fraction consisting substantially of a hydrocarbon selected from the group consisting of hydrocarbons containing two and three carbon atoms and mixtures thereof, the improvement which comprises trickling the hydrocarbon fraction in the liquid phase through a bed of solid hydrogenation catalyst in a reaction chamber in contact with hydrogen while controlling the throughput of the hydrocarbon fraction within the range of about 5–40 kilograms/liter of reaction chamber so that the effluent is substantially freed of said first-mentioned group member by the hydrogenation.

9. In a process for the selective hydrogenation of at least one member selected from the group consisting of butadiene and acetylenes in a butene containing $C_4$ hydrocarbon fraction, the improvement which comprises trickling the hydrocarbon fraction in the liquid phase through a bed of solid hydrogenation catalyst in a reaction chamber in contact with hydrogen while controlling the throughput of the hydrocarbon fraction within the range of about 10–40 kg./liter of reaction chamber, so that the effluent is substantially freed of said group member by the hydrogenation without the formation of any substantial amounts of butane.

10. Improvement according to claim 9 in which said hydrocarbon fraction is passed through said bed of solid hydrogenation catalyst in contact with hydrogen at a temperature between about 0–50° C.

11. Improvement according to claim 9 in which said hydrogenation catalyst comprises a metal of the 8th group of the periodic system of elements on a support.

12. Improvement according to claim 9 in which said hydrogenation catalyst comprises a member selected from the group consisting of nickel and cobalt in amounts from about 2–15 parts by weight on a support.

13. Improvement according to claim 9 in which said catalyst comprises about 0.2–4 parts by weight of a noble metal on a support.

14. Improvement according to claim 9 in which said hydrogenation catalyst is on a macroporous support having an internal surface of less than 50 m.$^2$/g. and a water absorption capacity of at least 10%.

15. Process according to claim 9 in which said hydrogenation catalyst comprises palladium on a support.

16. Improvement according to claim 15 in which said palladium is present in amount of about 0.2 to 4 parts by weight on said support.

17. Process for the selective hydrogenation of acetylenes in a $C_4$ hydrogenation fraction containing butene and butadiene which comprises trickling said hydrocarbon fraction in the liquid phase through a fixed bed of solid hydrogenation catalyst in a reaction chamber in contact with hydrogen while controlling the throughput of the hydrocarbon fraction within the rang of about 10–40 kg./liter of reaction chamber, so that the effluent is substantially freed of said acetylenes by the hydrogenation without any substantial conversion of the butadiene and butene by the hydrogenation.

18. Process according to claim 17 in which said hydrocarbon fraction is passed through said bed of solid hydrogenation catalyst in contact with hydrogen at a temperature between about 0–50° C.

19. Process according to claim 17 in which said hydrogenation catalyst comprises a metal of the 8th group of the periodic system of elements on a support.

20. Process according to claim 17 in which said hydrogenation catalyst comprises a member selected from the group consisting of nickel and cobalt in amounts from about 2–15 parts by weight on a support.

21. Process according to claim 17 in which said catalyst comprises about 0.2–4 parts by weight of a noble metal on a support.

22. Process according to claim 21 in which said hydrogenation catalyst is a palladium catalyst on a macroporous support having an internal surface of less than 50 m.$^2$/g. and a water absorption capacity of less than 10%.

23. Process according to claim 17 in which said hydrogenation catalyst is on a macroporous support having an internal surface of less than 50 m.$^2$/g. and a water absorption capacity of at least 10%.

24. A process for the selective hydrogenation of liquid hydrocarbons of the gasoline boiling range containing undesired unsaturated, especially, easily gumming hydrocarbons, in the presence of hydrogen and hydrogenation catalysts, which comprises carrying out the hydrogenation in the trickle phase at temperatures below 50° C. and by using the catalyst on macroporous support materials which have an intrinsic surface of less than approximately 50 m.$^2$/g. with a water absorption capacity of at least 10%.

25. Process as claimed in claim 24 which comprises using as liquid hydrocarbon a cracked gasoline from the pyrolysis of liquid and liquefiable hydrocarbons.

26. Process as claimed in claim 24 wherein the hydrocarbon fraction to be treated is led with hourly throughputs of 5 to 15 kg./liter of reaction chamber over the catalyst.

27. Process as claimed in claim 24 which comprises carrying out the process at temperatures between 0 and 50° C.

28. Process as claimed in claim 24, which comprises using as hydrogenation catalysts noble metals.

29. Process as claimed in claim 24, which comprises using as hydrogenation catalysts metals of the 8th group of the periodic system of the elements.

30. Process as claimed in claim 24, which comprises using as sydrogenation catalysts noble metals in amounts of 0.1 to 5 parts by weight on the support.

31. Process as claimed in claim 24, which comprises using the hydrogenation catalysts on a macroporous support with an internal surface of less than 50 m.$^2$/g. and a water absorption capacity of at least 10%.

32. Process according to claim 24 which comprises using palladium as said hydrogenation catalyst.

33. Processes claimed in claim 24 wherein the hydrocarbon fraction to be treated is led with hourly throughputs of 1 to 20 kg./liter of reaction chamber.

References Cited in the file of this patent

UNITED STATES PATENTS

| | | |
|---|---|---|
| 2,402,493 | Greenfelder et al. | June 18, 1946 |
| 2,608,521 | Hoog | Aug. 26, 1952 |